United States Patent [19]

Moyers, Jr.

[11] 3,796,060
[45] Mar. 12, 1974

[54] PROCESS FOR PURIFICATION BY CRYSTALLIZATION

[75] Inventor: Charles Guthrie Moyers, Jr., Charleston, W. Va.

[73] Assignee: Union Carbide Corporation, New York, N.Y.

[22] Filed: Feb. 22, 1971

[21] Appl. No.: 117,526

[52] U.S. Cl. .................. 62/58, 23/273 F, 62/123
[51] Int. Cl. .............................................. B01d 9/04
[58] Field of Search ................ 23/273 F; 62/58, 123

[56] References Cited
UNITED STATES PATENTS

| | | | |
|---|---|---|---|
| 2,324,869 | 7/1943 | Oman | 62/58 |
| 2,617,274 | 11/1952 | Schmidt | 23/273 |
| 2,676,167 | 4/1954 | Findlay et al. | 23/273 |
| 2,747,001 | 5/1956 | Weedman | 23/273 |
| 2,765,921 | 11/1956 | Green | 23/273 |
| 2,862,797 | 12/1958 | McKay | 23/273 |
| 2,922,701 | 1/1960 | Ratje | 23/273 |
| 3,212,281 | 10/1965 | McKay | 62/58 |
| 3,261,170 | 7/1966 | McCarthy et al. | 62/58 |
| 3,296,811 | 1/1967 | Stoller | 62/58 |
| 3,501,275 | 3/1970 | Sailer et al. | 23/273 |

*Primary Examiner*—Norman Yudkoff
*Assistant Examiner*—R. T. Foster
*Attorney, Agent, or Firm*—Gerald R. O'Brien, Jr.

[57] ABSTRACT

A process and apparatus are disclosed for the purification of multi-component liquid feed material having a crystallizable component employing a centrally-fed purification column substantially free of internal obstructions, a freezing chamber in communication with one end of the purification column, a melting chamber in communication with the other end of the purification column, and displacement means in the freezing chamber for passing frozen crystallizable component from the freezing chamber to the purification chamber and melting chamber.

3 Claims, 1 Drawing Figure

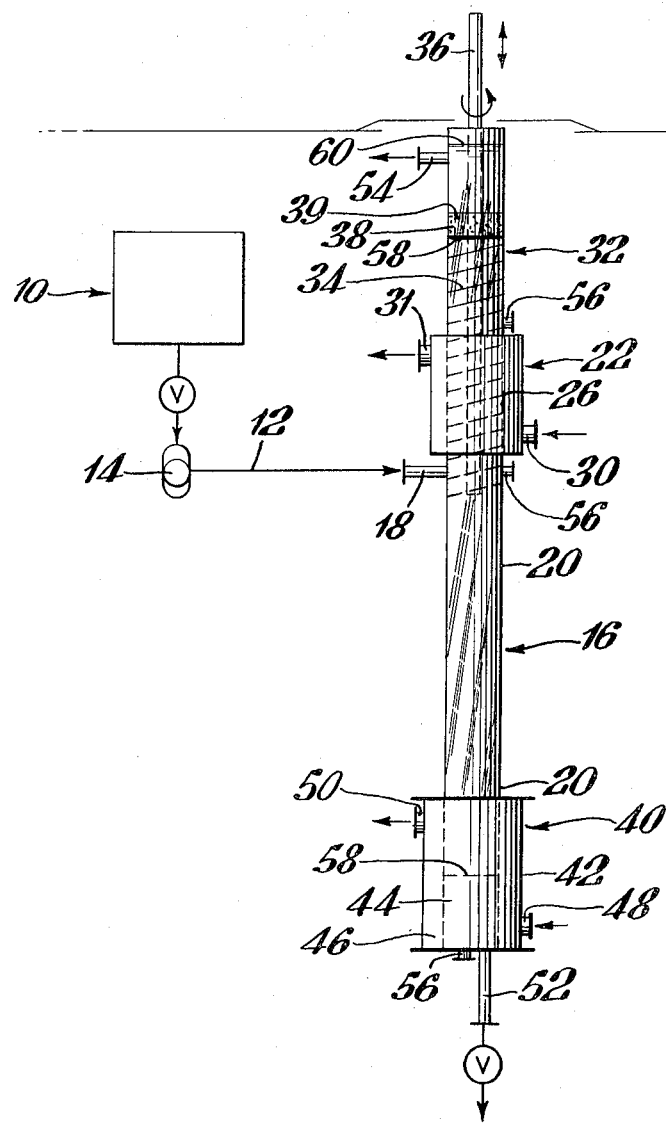

PROCESS FOR PURIFICATION BY CRYSTALLIZATION

The present invention relates to crystallization purification process and apparatus and, more particularly, to such process and apparatus in a column-type system.

Heretofore, a number of systems have been suggested for the crystallization purification of multi-component liquid streams. However, only two such prior systems of the column-type have been thought sufficiently practical to have been broadly utilized on a commercial or laboratory scale.

In one such system, an end-fed column is employed having freezing means positioned near the inlet feed end, melting means positioned near the opposite product outlet end hydraulic force pulsing means positioned near the product outlet end to transport solids.

In the other such system, a center-fed column is employed having freezing means positioned near one end of the column, melting means positioned near the other end, rotary and oscillatory conveyor means in the column to convey solids, with the purified product removed through the melting means and the filtrate removed through the freezing means.

It has long been realized that each of these systems presents serious problems for broad scale use. The former system presents the difficulty that it is unsuitable for total reflux operation which is often desired. In addition, since the solid phase is formed externally of the column, the internal liquid reflux in the column is essentially fixed by the thermodynamic state of the feed relative to the product stream. Consequently, product purity may be impaired because of the inflexible reflux limitation.

The latter system presents the difficulty that scale-up for commercial use is extremely difficult due to the mechanical complexity of the internal conveyor means employed within the column. No apparatus based on this system, having a diameter greater than 6 inches, is known to have been built during the approximately 10 years since the system was first disclosed.

It is, therefore, the prime object of the present invention to provide a process and apparatus for crystalline purification of multi-component liquid streams which are capable of utilization at all controlled reflux conditions including full reflux and which are not subject to mechanical complexity difficulties when scaled up to commercially useful sizes.

Other aims and advantages of the present invention will be apparent from the following description and associated drawing.

In accordance with the present invention, a process is provided for the purification of multi-component liquid feed material having a crystallizable component comprising: introducing said liquid feed material into an elongated purification zone substantially free of internal obstructions; passing liquid feed material from the purification zone to a freezing zone, positioned in communication with an end of the purification zone, to freeze a component of the liquid feed material to the crystalline phase; displacing crystalline phase material from the freezing zone into the purification zone; maintaining a heated melting zone in communication with the opposite end of the purification zone to re-melt the crystalline phase material passed into it; maintaining temperature balance on both the freezing and melting zones to produce a controlled reflux rate of crystallizable component through the purification zone, and withdrawing highly purified crystallizable component from the melting zone and the other components of the multi-component liquid feed from the freezing zone at a rate coordinated with the rate of introduction of liquid feed material and the temperature balance maintained in both the freezing and melting zones.

In accordance with the apparatus aspect of the present invention, apparatus is provided for the purification of multi-component liquid feed material having a crystallizable component comprising: a purification column having opposite ends and being substantially free of internal obstructions for introducing feed material thereto and inlet means a freezing chamber positioned in communication with one end of the purification column and having outlet means near the end thereof opposite said communication; a melting chamber positioned in communication with the other end of the column and having outlet means near the end thereof opposite said communication; and displacement means associated with the freezing chamber for passing frozen crystallizable component from the freezing chamber to the purification chamber and the melting chamber.

As employed herein, the term "multi-component feed material" denotes a liquid solution having a crystallizable component, the solution exhibiting either a eutectic or solid solution liquid-solid phase behavior. Such materials are well known to the art, para-xylene and meta-xylene being a typical example of the eutectic type, and naphthalene and $\beta$-naphthol being a typical example of the solid solution type. A lengthy listing of groups of illustrative systems of components is set forth in column 13, lines 25–74 of U.S. Pat. No. 2,854,494, which listing is incorporated herein by reference.

In general, however, the present invention is applicable to the purification of any material that has a well-defined melting point in the range of from −150°C. to +250°C., a range which would include most organic chemicals and exclude most inorganic chemicals.

Accordingly, as employed herein, the terms "freezer," "freezing" and "freezer means" refer to the solid state crystallization in solution of the meltable component to be purified, upon cooling. The multi-component feed material may also be an aqueous material, such as foods or juices, which may be concentrated by the removal of water, or salt brines from which it may be desired to remove purified water.

It is to be noted that the "multi-component feed material" may constitute merely a binary system of components or may constitute a system having a large number (i.e. 20) of components. The sole requirement is that the system is such that a solid phase is formed when the feed material is cooled to within the range indicated above.

It is to be understood that the selection of the heating and coolant fluids employed is neither critical nor restricted to a small group. Any heating or cooling fluid may be employed that will provide the heat transfer required for a particular heating or cooling operation with the material to be melted and frozen. For certain operations, the heating fluid could be water, or the like, or an organic fluid, such as ethylene glycol. For certain operations, the cooling fluid could be a liquified gas, such as liquid nitrogen, liquified halocarbon, water or a normally-liquid organic fluid. The heating and cooling fluids may, under some conditions be gaseous, such as steam, air nitrogen, carbon dioxide, gaseous hydrocarbon, or the like.

In the appended drawing, the single FIGURE schematically set forth, in elevational view, crystallization purification apparatus representing one embodiment of the invention.

As there shown, multi-component feed material to be crystallization purified is passed from storage tank 10, through line 12, by pump 14, to crystallization-purification column system 16. The material enters column system 16 through inlet means 18, positioned generally between column section 20 and communicating freezer means 22. Freezer means 22 comprises an outer cylindrical sleeve 24 concentrically positioned about an inner cylindrical member 26 to form an annular coolant passage 28 between coolant inlet port 30 and coolant outlet port 31.

Associated with freezer means 22 and the region 32 (optional) above it is a flat, internal wall scraper 34 for keeping the internal side walls clear of crystal formation. Wall scraper 34 is driven in a rotary and oscillatory manner by drive shaft 36 which also actuates piston 38 (having porous drill ports 39) in a similar manner to pass crystals from the freezer means to the column section 20.

Heating means 40 are positioned in communication with column section 20 at its opposite end. Heating means 20 comprises an outer cylindrical member 42 concentrically positioned about inner cylindrical member 44 so as to form annular heating passage 46 between heating fluid inlet port 48 and heating fluid outlet port 50.

Purified product material is passed from the system through product outlet 52, while the other components of the multi-component inlet feed are passed from the system through overflow liquid outlet 54. Thermocouples 56 are positioned at desirable temperature measurement points as desired.

The solid phase is constrained within the column system by screens 58 positioned near the base of heating means 40 and the lower face of porous piston 38.

The purification column section 20 is free of internal members and presents a region of continuous liquid phase material in contact with a discontinuous phase of solid (crystalline) material.

In 40-inch long, 1-inch I.D. over-all column system, having stainless steel jacketed freezer and heater sections, flat, Teflon scraper blades and multi-drilled Teflon piston, typical scraper and piston operation were as follows:

Stroke Rate: 30 per minute
Stroke Length: ⅜-inch
Scraper Speed: 120 RPM

The screens 58 which were employed to constrain the solid phase in the column system were 1-inch diameter Millipore perforated discs (300 micron diameter holes — 6 percent open area).

In various embodiments of apparatus tested, 1-inch diameter purification columns having lengths of 6-inches, 12-inches and 18-inches were employed, each in conjunction with 6-inch heater and 6-inch freezer sections.

In operation in accordance with the invention, feed material is center-fed to the column system, to the liquid height indicated at 60 in the drawing, with the heater off and freezer on and the product outlet closed and overhead outlet open until a solids inventory is established. The heater is then turned on and operation continued until desired remelting equilibrium is established under total reflux conditions. Thereupon, steady state conditions are attained in which discontinuous solid phase is built up in the continuous liquid phase of the purification chamber. Thereupon, the inlet feed, the product outlet, the overflow outlet, and the heater and freezer controls are balanced to obtain the controlled reflux conditions required for the desired purification operation.

The following examples set forth data for the purification of acetamide from a binary eutectic system of acetamide and water. Acetamide of greater than 99.9 percent purity was produced continuously from solutions containing 0.03 to 0.10 mass fraction water.

TABLE

| Example No. | Feed | | Product | | Reflux Ratio | Separation Efficiency | Yield |
|---|---|---|---|---|---|---|---|
| | Rate cc/hr | Composition ppm | Rate cc/hr | Composition ppm | | | |
| 1 | 210. | 42,000 | 70. | 200. | 3.7 | 99.5 | 35.0 |
| 2 | 450. | 51,000 | 50. | 500. | 5.5 | 98.4 | 11.7 |
| 3 | 202. | 44,000 | 70. | 700. | 2.4 | 98.9 | 36.2 |
| 4 | 225. | 89,000 | 40. | 1200. | 8.6 | 98.6 | 19.5 |
| 5 | 328. | 29,000 | 68. | 900. | 4.5 | 96.7 | 21.3 |
| 6 | 304. | 34,300 | 64. | 1500. | 8.7 | 95.7 | 21.8 |
| 7 | 330. | 40,200 | 150. | 2600. | 3.3 | 93.4 | 47.5 |

The first five examples were carried out in a column system having a 12-inch purification zone, while the last two examples were carried out in a column system having a 6-inch purification zone. The other dimensions and the displacement and rotation data are as set forth hereinabove in connection with the description of the apparatus.

It has been found from analysis of comparative data obtained from the apparatus of the invention and that of the prior art that, the use of a dense crystal bed in the column of the apparatus of the invention prevents backmixing in the liquid phase and allows the use of shorter column lengths than must be employed in the highly backmixed prior art apparatus.

I claim:
1. Process for the purification of multi-component feed material having a crystallizable component comprising: providing spaced freezing and melting zones, each of said zones being jacketed, a purification zone intermediate of said freezing and melting zones, and porous piston means positioned and operative to displace crystalline phase material from said freezing zone to said purification zone; introducing liquid feed material into said purification zone; maintaining temperature balance on both said freezing and melting zones to produce a controlled reflux rate of crystallizable component through said purification zone; separating said crystalline phase material from the other liquid phase components of said multi-component liquid feed in said purification zone; and withdrawing highly purified crystallizable component from said melting zone and the other components of said multi-component liquid from said freezing zone.

2. Process in accordance with claim 1, wherein said controlled reflux rate of crystallizable component through said purification zone is maintained so as to provide total reflux.

3. Process for continuous purification of multi-component feed material having a crystallizable component comprising: providing spaced freezing and melting zones, each of said zones being jacketed, a purification zone intermediate of said freezing and melting zones, and porous piston means positioned and operative to displace crystalline phase material from said freezing zone to said purification zone; continuously introducing liquid feed material into said purification zone; maintaining temperature balance on both said freezing and melting zones to produce a controlled reflux rate of crystallizable component through said purification zone; continuously separating said crystalline phase material from the other liquid phase components of said multi-component liquid feed in said purification zone; and continuously withdrawing highly purified crystallizable component from said melting zone and the other components of said multi-component liquid from said freezing zone at rates coordinated with the rate of continuous introduction of said liquid feed material and the temperature balance maintained in said freezing and melting zones.

* * * * *